(12) United States Patent
Enomoto et al.

(10) Patent No.: US 8,201,455 B2
(45) Date of Patent: Jun. 19, 2012

(54) PRESSURE SENSOR HAVING THIN FILM SECTIONS

(75) Inventors: Hideki Enomoto, Ikoma (JP); Katsumi Kakimoto, Katano (JP)

(73) Assignee: Panasonic Corporation, Osaka (JP)

( * ) Notice: Subject to any disclaimer, the term of this patent is extended or adjusted under 35 U.S.C. 154(b) by 12 days.

(21) Appl. No.: 12/918,635

(22) PCT Filed: Apr. 8, 2009

(86) PCT No.: PCT/JP2009/057193
§ 371 (c)(1),
(2), (4) Date: Aug. 20, 2010

(87) PCT Pub. No.: WO2009/131006
PCT Pub. Date: Oct. 29, 2009

(65) Prior Publication Data
US 2011/0005323 A1    Jan. 13, 2011

(30) Foreign Application Priority Data
Apr. 24, 2008 (JP) .................................. 2008-113992

(51) Int. Cl.
*G01L 13/02* (2006.01)

(52) U.S. Cl. ........................................... 73/716; 73/736
(58) Field of Classification Search ............. 73/700–756
See application file for complete search history.

(56) References Cited

U.S. PATENT DOCUMENTS

| | | | |
|---|---|---|---|
| 5,317,920 A * | 6/1994 | Kremidas ........................ 73/720 |
| 5,450,754 A | 9/1995 | Biebl et al. |
| 6,968,743 B2 * | 11/2005 | Rich et al. ....................... 73/724 |
| 2005/0088270 A1 * | 4/2005 | Mei ............................... 336/200 |

FOREIGN PATENT DOCUMENTS

| | | |
|---|---|---|
| JP | 6-307960 | 11/1994 |
| JP | 07-005060 | 1/1995 |
| JP | 08-247874 | 9/1996 |
| JP | 2001-124643 | 5/2001 |
| JP | 2002-323395 | 11/2002 |
| JP | 2006-126127 | 5/2006 |
| JP | 2007-205858 | 8/2007 |

* cited by examiner

*Primary Examiner* — Andre Allen
(74) *Attorney, Agent, or Firm* — Greenblum & Bernstein P.L.C.

(57) ABSTRACT

A diaphragm section has a mesh-like beam section which partitions the diaphragm section into a plurality of rectangular regions, and a thin film section formed in the region partitioned by the beam section, and the thickness of the thin film section is less than that of the beam section.

20 Claims, 6 Drawing Sheets (a)

(b)

(c)

PRESSURE SENSOR HAVING THIN FILM SECTIONS

TECHNICAL FIELD

The present invention relates to a pressure sensor including a diaphragm section.

BACKGROUND ART

Heretofore, a pressure sensor has been known, which detects a pressure by detecting a quantity of displacement caused in a diaphragm section when the diaphragm section receives the pressure. In order to enhance sensitivity of the pressure sensor as described above without changing a constituent material thereof, it is necessary to increase a pressure receiving area of the diaphragm section or such a displacement quantity per unit pressure. However, in recent years, device miniaturization has been strongly required, and accordingly, it is difficult to enhance the sensitivity of the pressure sensor by increasing the pressure receiving area of the diaphragm section. From such a background, it is desired to enhance the sensitivity of the pressure sensor by increasing the displacement quantity of the diaphragm section per unit pressure.

As shown in the following Expression (1), a displacement quantity y at a center of a disc-like diaphragm section is determined based on properties of a material that composes the diaphragm section, and on a size (area) and thickness of the diaphragm section. Note that, in Expression (1), parameters v, E, t, a and P indicate a Poisson's ratio and Young's modulus of the material that composes the diaphragm section, the thickness and radius of the diaphragm section, and the pressure applied to the diaphragm section, respectively. Specifically, the thickness t of the diaphragm section is thinned, whereby the displacement quantity y of the diaphragm section per unit pressure is increased, and the sensitivity of the pressure sensor can be enhanced. However, in the case where the thickness t of the diaphragm section is thinned, when an excessive pressure is applied to the diaphragm section, there is a possibility that the diaphragm section may be broken since the diaphragm section cannot resist the pressure concerned. From such a background, it is desired to provide a high-sensitivity and small-size pressure sensor having high pressure resistance, that is, the pressure sensor less likely to be broken even in the case where the excessive pressure is applied thereto.

$$y=(3/16)\times\{(1-v^2)/Et^3\}\times a^4 p \quad (1)$$

The present invention has been made in order to solve the foregoing problem. It is an object of the present invention to provide the high-sensitivity and small-size pressure sensor that is less likely to be broken even in the case where the excessive pressure is applied thereto.

CITATION LIST

Patent Literature 1: Japanese Patent Laid-Open Publication No. 2006-126127
Patent Literature 2: Japanese Patent Laid-Open Publication No. 2007-205858

DISCLOSURE OF INVENTION

A pressure sensor according to the present invention is a pressure sensor for detecting a pressure difference between a pressure on one surface side of a diaphragm section and a measurement target pressure on other surface side of the diaphragm section. The pressure sensor comprises: a first substrate having the diaphragm section; and a second substrate joined to one surface side of the first substrate to form one surface side of the diaphragm section in a substantially hermetically sealed structure, wherein the diaphragm section includes: a mesh-like beam section that partitions the diaphragm section into a plurality of regions; and thin film sections formed in the plurality of regions partitioned by the beam section, and the thin film sections are formed so that a thickness thereof can be thinner than a thickness of the beam section.

DESCRIPTION OF EMBODIMENTS

A description is made below of a configuration of a pressure sensor that becomes an embodiment of the present invention with reference to the drawings.

[Configuration of Pressure Sensor]

Figure 1:
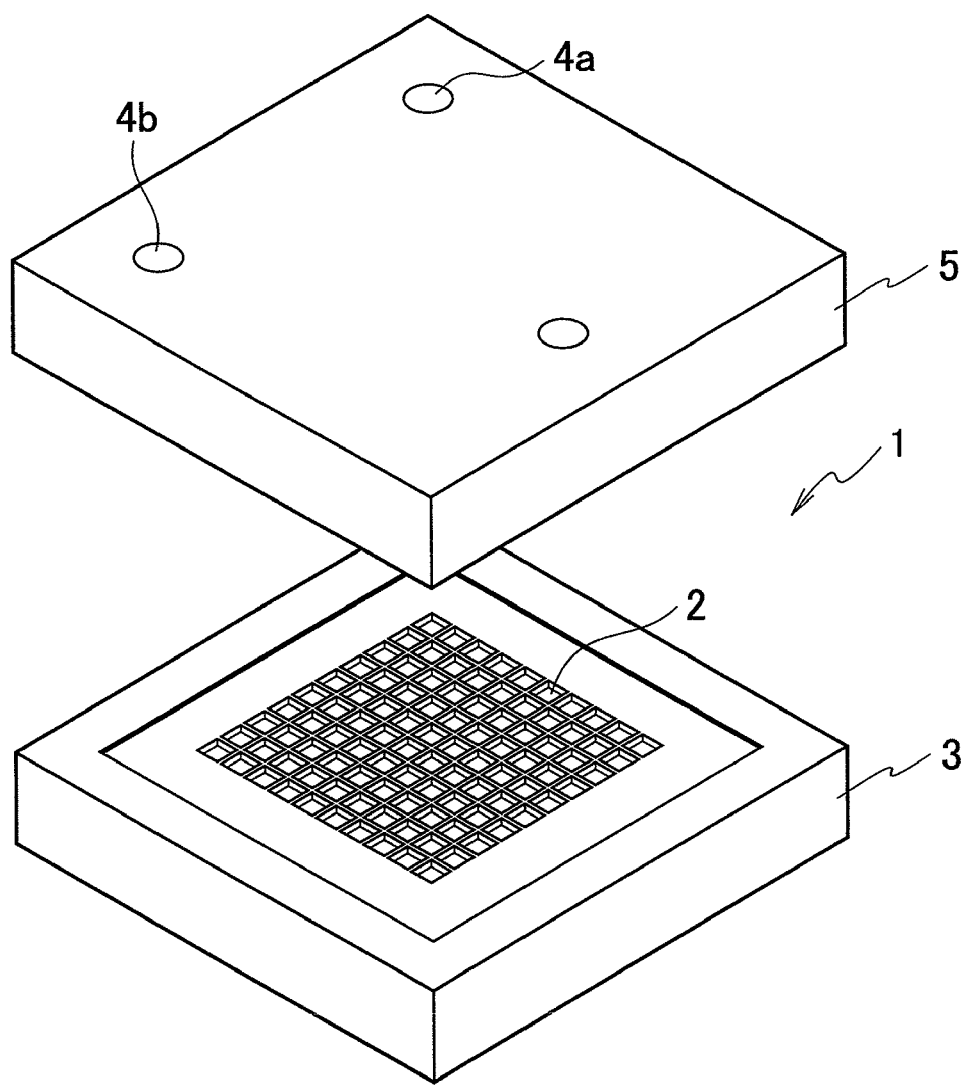
FIG. 1 is an exploded perspective view of a pressure sensor according to an embodiment of the present invention.
Figure 2:
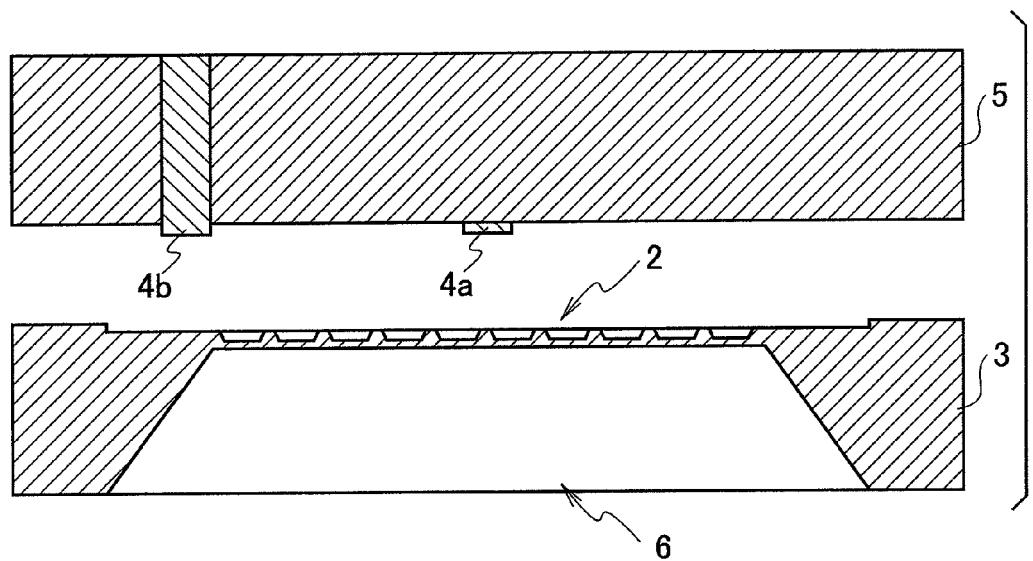
FIG. 2 is a cross-sectional view of the pressure sensor shown in FIG. 1.
Figure 3:
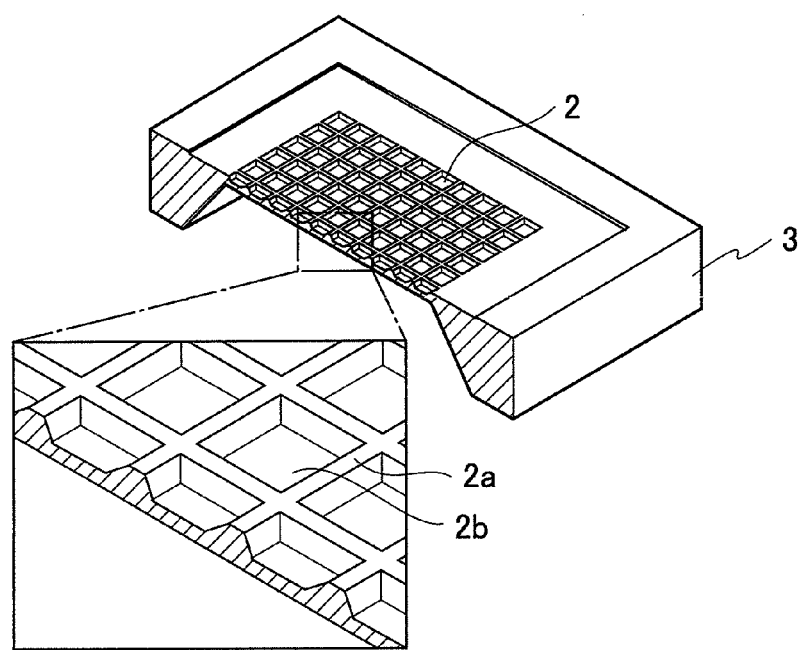
FIG. 3 is a partially enlarged view of a diaphragm section in the pressure sensor shown in FIG. 1.

FIG. 1 is an exploded perspective view of the pressure sensor 1 according to an embodiment of the present invention, FIG. 2 is a cross-sectional view of the pressure sensor 1 shown in FIG. 1, and FIG. 3 is a partially enlarged view of a diaphragm section of the pressure sensor 1 shown in FIG. 1.

As shown in FIG. 1, the pressure sensor 1 according to the embodiment of the present invention includes, as main constituents: a substrate 3 (first substrate) having a rectangular diaphragm section 2; and a substrate 5 (second substrate) having an electrode 4a and a reference electrode 4b. One surface side of the diaphragm section 2 is formed in a hermetically sealed structure by joining outer peripheral portions of the substrate 3 and the substrate 5 to each other. Note that, although not shown, a recessed portion is formed on at least one of a surface side of the substrate 5, which corresponds to the diaphragm section 2 and is opposite to the substrate 3, and the diaphragm section 2. This recessed portion becomes a hermetically sealed space that is sealed at a predetermined pressure when the outer peripheral portions of the substrate 3 and the substrate 5 are joined to each other. This hermetically sealed space may be formed not by forming the recessed portion but by providing a spacer between the substrate 3 and the substrate 5.

As shown in FIG. 2, the diaphragm section 2 is formed by performing removal processing for other surface side of the substrate 3. In this embodiment, as shown in FIG. 3, the diaphragm section 2 includes: a mesh-like beam section 2a that partitions the rectangular diaphragm section 2 into a plurality of rectangular regions smaller in area than the whole of the diaphragm section 2; and thin film sections 2b formed in the regions partitioned by the beam section 2b. The thin film sections 2b are formed so that a thickness thereof can be thinner than a thickness of the beam section 2a. In this embodiment, the beam section 2a is formed into a so-called tapered shape that is inclined toward an inside direction of the thin film section 2b; however, the area of the thin film sections 2b may be increased without forming the beam section 2a into the tapered shape. Moreover, a surface of the substrate 3, which is opposite to the substrate 5, may be formed into a flat shape, and the beam section 2a may be formed on other side surface of the substrate 3.

Figure 4:
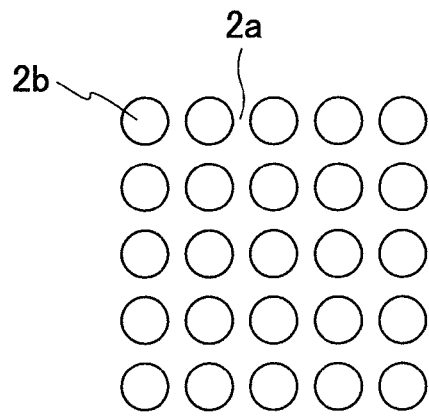
FIGS. 4(a) to 4(c) are schematic views showing modification examples of a shape of a thin film section shown in FIG. 3.
Figure 4:
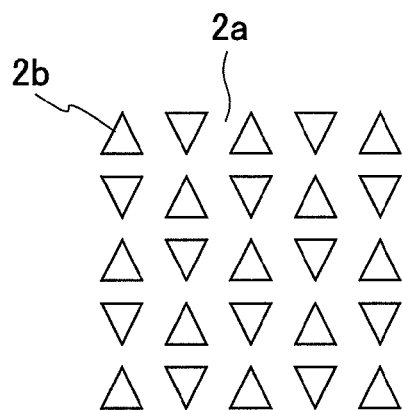
Figure 4:
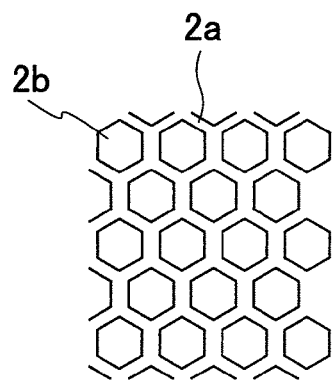

Although not shown, electrodes are formed at positions of the surface of the diaphragm section 2, which are opposite to the electrode 4a and the electrode 4b. In this embodiment, the electrodes are formed on the surface of the diaphragm section 2; however, the substrate 3 itself may be used as the electrodes without forming the electrodes. Moreover, in this embodiment, the beam section 2a partitions the diaphragm section 2 into the plurality of rectangular regions; however, as shown in FIGS. 4(a) to 4(c), the beam section 2a may partition the diaphragm section 2 into regions with shape other than the rectangular shapes, for example, such as circular shapes, triangular shapes and hexagonal shapes.

[Operation of Pressure Sensor]

In the pressure sensor 1 having the configuration as described above, when a pressure (measurement target pressure) is applied to other surface side of the diaphragm section 2, the electrodes provided on the substrate 3 side are displaced with respect to the reference electrode 4b and the electrode 4a provided at a position opposite to a substantial center of the diaphragm section 2 in response to a pressure difference between a pressure in the hermetically sealed space and the measurement target pressure, and electrostatic capacitance between the electrode provided on the substrate 3 side and the electrode 4a and electrostatic capacitance between the electrode provided on the substrate 3 side and the reference electrode 4b are changed. Hence, in accordance with the pressure sensor 1 having the configuration as described above, the pressure difference between the pressure in the hermetically sealed space and the measurement target pressure is detected as a variation of the electrostatic capacitance, whereby the measurement target pressure can be detected. Note that, as shown in FIG. 1, the reference electrode 4b is provided at a position opposite to a thick film section located on an outer peripheral side of the thin film sections 2b. Hence, while taking, as a reference, a capacity in the thick film section in which a displacement quantity with respect to the pressure is smaller, a difference in capacity between the thick film section concerned and the thin film sections 2b in which a displacement quantity with respect to the pressure is larger is detected, whereby influences from manufacturing variations, temperature characteristics and the like are reduced, and the pressure can be detected with high reliability. In this embodiment, the pressure difference between the pressure in the hermetically sealed space and the measurement target pressure is detected as the variation of the electrostatic capacitance; however, the pressure difference may be detected by arranging a piezoresistor on a surface of the diaphragm section 2. Specifically, in the diaphragm section 2, distortion is generated in response to the pressure difference between the pressure in the hermetically sealed space and the measurement target pressure. Hence, a quantity of the distortion is detected as a variation of a resistance value of the piezoresistor, whereby the pressure difference between the pressure in the hermetically sealed space and the measurement target pressure can be detected.

As apparent from the above description, in the pressure sensor according to the embodiment of the present invention, the diaphragm section 2 includes: the mesh-like beam section 2a that partitions the rectangular diaphragm section 2 into the plurality of rectangular regions; and the thin film sections 2b formed in the regions partitioned by the beam section 2a, wherein the thin film sections 2b are formed so that the thickness thereof can be thinner than the thickness of the beam section 2a. With such a configuration, as compared with the case where a thickness of the diaphragm section 2 is made equal to the thickness of the beam section 2a as a whole, a displacement quantity of the diaphragm section 2 per unit pressure is increased. Meanwhile, the entire area of the thin film sections 2b is smaller than the area of the whole diaphragm section 2, and accordingly, the pressure resistance of the pressure sensor 1 is enhanced as compared with the case where the thickness of the diaphragm section 2 is made equal to the thickness of the thin film sections 2b as a whole. Hence, in accordance with the pressure sensor 1 that becomes the embodiment of the present invention, there can be provided a high-sensitivity and small-size pressure sensor that is less likely to be broken even in the case where an excessive pressure is applied thereto.

Figure 5:
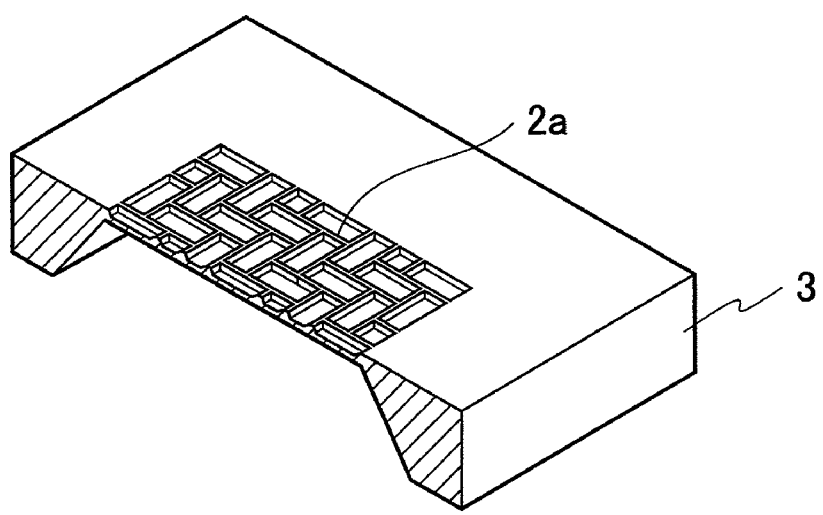
FIG. 5 is a perspective view showing a modification example of the diaphragm section in the pressure sensor shown in FIG. 1.

Note that, in this embodiment, as shown in FIG. 3, the beam section 2a is linearly formed from an outer peripheral portion of the diaphragm section 2 to the center thereof. However, as shown in FIG. 5, the beam section 2a may not be linearly formed from the outer peripheral portion of the diaphragm section 2 to the center thereof. In this case, at least one thin film section 2b may be formed on each of straight lines which connect the outer peripheral portion of the diaphragm section 2 and the center thereof to each other. With such a configuration, the displacement quantity of the diaphragm section 2 per unit pressure can be further enhanced, and accordingly, the sensitivity of the pressure sensor 1 can be further enhanced.

Figure 6:
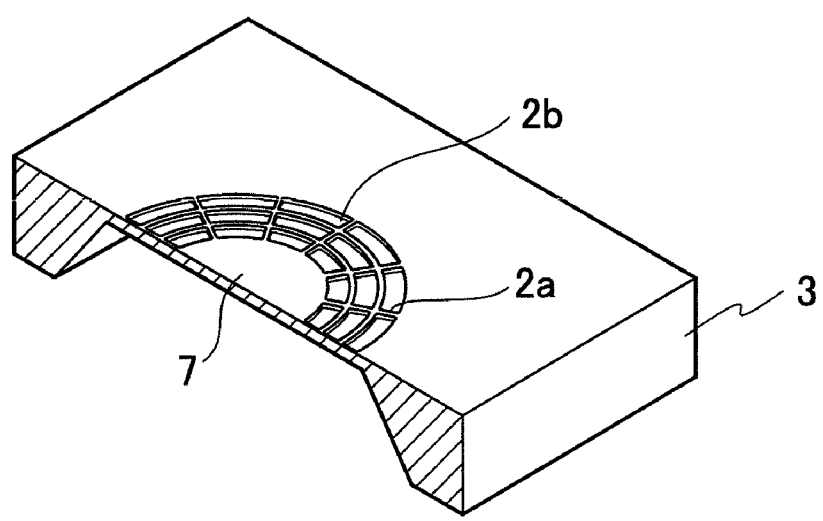
FIG. 6 is a perspective view showing a modification example of the diaphragm section in the pressure sensor shown in FIG. 1.

Moreover, as a configuration of a modification example of the beam section 2a and the thin film sections 2b, as shown in FIG. 6, the beam section 2a and the thin film sections 2b may be formed so as to become point-symmetric with respect to the center position of the diaphragm section 2 at every predetermined angle. With such a configuration, the displacement of the diaphragm section 2 becomes symmetric with respect to the center position thereof, and accordingly, more stable displacement is obtained. Therefore, particularly when the pressure sensor 1 is applied to a so-called piezoresistor pressure sensor that detects the pressure difference between the pressure in the hermetically sealed space and the measurement target pressure as the variation of the resistance value of the piezoresistor, linearity of an output of the pressure sensor can be enhanced. Moreover, also in this case, as in the example shown in FIG. 5, as shown in FIG. 7, at least one thin film section 2b is formed on each of the straight lines which connect the outer peripheral portion of the diaphragm section 2 and the center thereof to each other, whereby the sensitivity of the pressure sensor 1 can be further enhanced.

Figure 7:
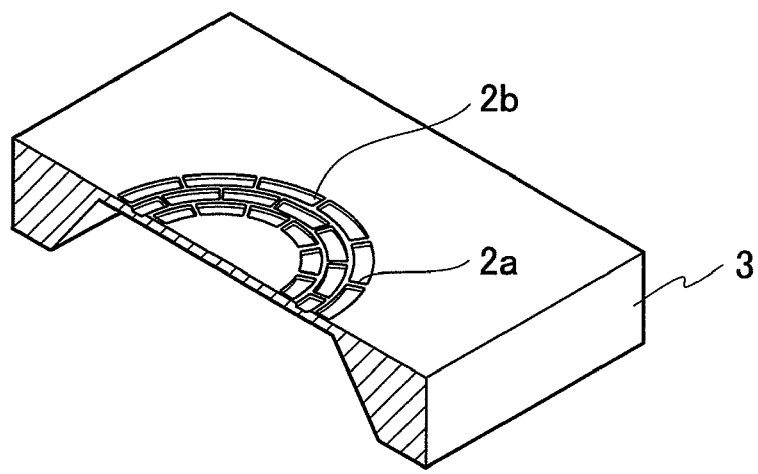
FIG. 7 is a perspective view showing a modification example of the diaphragm section in the pressure sensor shown in FIG. 1.
Figure 8:
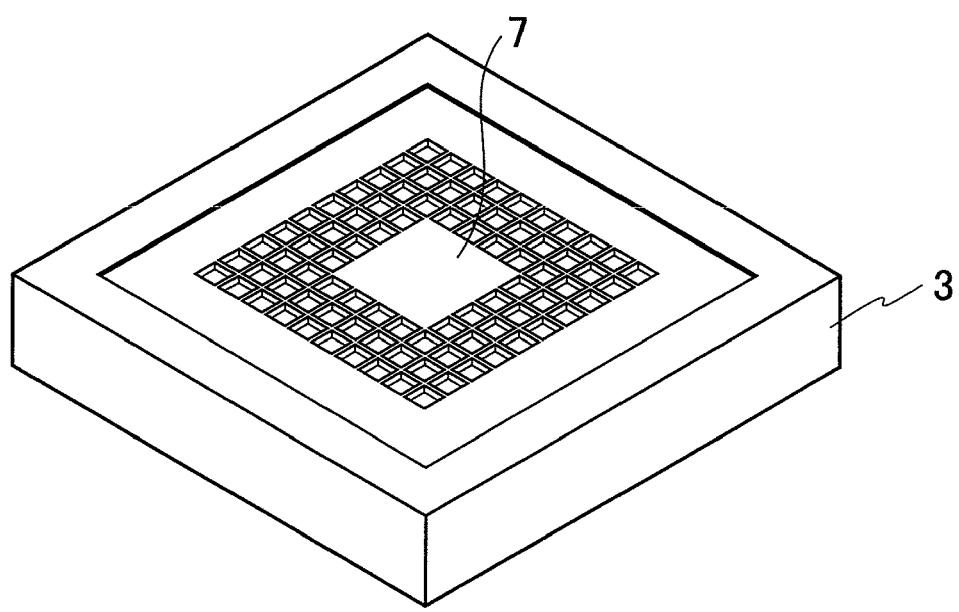
FIG. 8 is a perspective view showing a modification example of the diaphragm section in the pressure sensor shown in FIG. 1.
Figure 9:
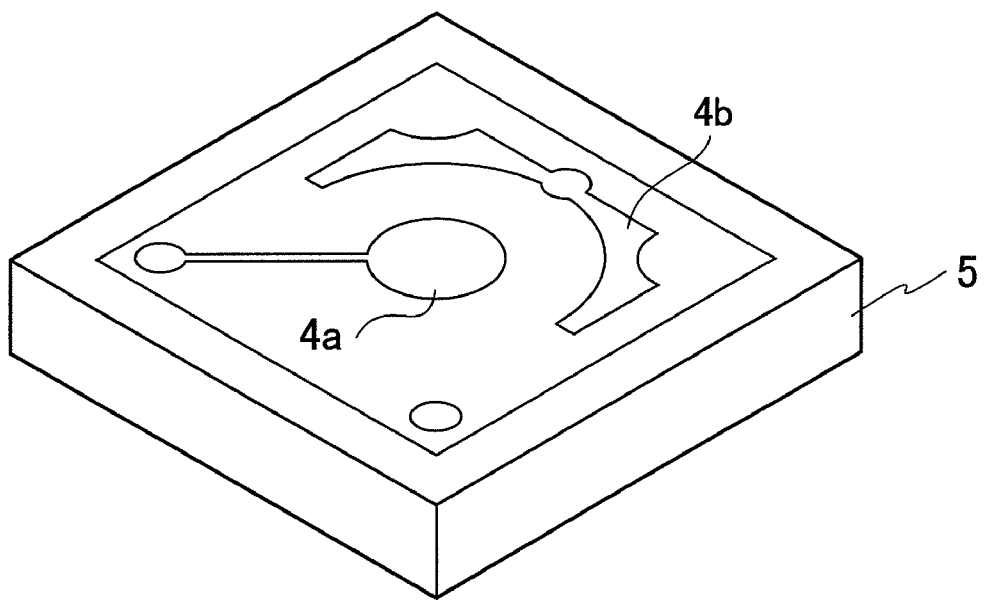
FIG. 9 is a perspective view showing a reference electrode opposite to the diaphragm sections shown in FIGS. 6 and 7.

Moreover, as a configuration of the modification example of the beam section 2a and the thin film sections 2b, as shown in FIG. 6 to FIG. 8, a thick film section 7 thicker than the thin film sections (in the illustrated examples, a thickness of the thick film section 7 is the same as that of the beam section 2*a*) may be formed on the center region of the diaphragm section. With such a configuration, the electrode provided on the substrate 3 side and the electrode are opposite to each other substantially in parallel. Accordingly, particularly when the pressure sensor 1 is applied as a so-called electrostatic capacitive pressure sensor that detects the pressure difference between the pressure in the hermetically sealed space and the measurement target pressure as the variation of the electrostatic capacitance, the linearity of the output of the pressure sensor can be enhanced. Note that, in this case, as shown in FIG. 9, it is desirable that the reference electrode 4*b* (or a reference piezoresistor) on the substrate 5 side be provided at the position opposite to the thick film section located on the outer peripheral side of the thin film sections 2*b*. With such a configuration, while taking, as a reference, the capacity (or the resistance value) in the thick film section in which the displacement quantity with respect to the pressure is smaller, the difference in capacity (or resistance value) between the thick film section concerned and the thin film sections in which the displacement quantity with respect to the pressure is larger is detected, whereby the influences from the manufacturing variations, the temperature characteristics and the like are reduced, and the pressure can be detected with high reliability.

The description has been made above of the embodiment to which the present invention made by the inventors is applied; however, the present invention is not limited to the description and the drawings, which are in accordance with the embodiment and form a part of the disclosure of the present invention. It is additionally mentioned that, specifically, other embodiments, examples, operation technologies and the like, which are made by those skilled in the art based on the embodiment, are entirely incorporated in the scope of the present invention.

Industrial Applicability

The present invention can be applied to the pressure sensor including the diaphragm section.

The invention claimed is:

1. A pressure sensor for detecting a pressure difference between a pressure on one surface side of a diaphragm section and a measurement target pressure on other surface side of the diaphragm section, the pressure sensor comprising:
    a first substrate having the diaphragm section; and
    a second substrate joined to one surface side of the first substrate to form one surface side of the diaphragm section in a substantially hermetically sealed structure,
    wherein the diaphragm section includes: a mesh-like beam section that partitions the diaphragm section into a plurality of regions; and thin film sections formed in the plurality of regions partitioned by the beam section, and the thin film sections are formed so that a thickness of the thin film sections is thinner than a thickness of the beam section.

2. The pressure sensor according to claim 1, wherein the second substrate includes a second electrode opposite to a substantial center of the diaphragm section, and the pressure difference is detected by detecting a change of electrostatic capacitance between a first electrode provided on the first substrate side and the second electrode.

3. The pressure sensor according to claim 1, wherein a piezoresistor is provided on a surface of the diaphragm section, and the pressure difference is detected by detecting a change of a resistance value of the piezoresistor.

4. The pressure sensor according to claim 1, wherein at least one of the thin film sections is provided on each of straight lines which connect a center and outer peripheral portion of the diaphragm section to each other.

5. The pressure sensor according to claim 1, wherein the beam section and the thin film sections are formed in point-symmetry with respect to the center of the diaphragm section at every predetermined angle.

6. The pressure sensor according to claim 5, wherein at least one of the thin film sections is provided on each of straight lines which connect the center and outer peripheral portion of the diaphragm section to each other.

7. The pressure sensor according to claim 5, wherein the second substrate includes an electrode or a piezoresistor at a position opposite to a thick film section of the first substrate which is located on an outer peripheral side of the thin film sections arranged in a substantially circular shape.

8. The pressure sensor according to claim 6, wherein the second substrate includes an electrode or a piezoresistor at a position opposite to a thick film section of the first substrate which is located on an outer peripheral side of the thin film sections arranged in a substantially circular shape.

9. The pressure sensor according to claim 2, wherein at least one of the thin film sections is provided on each of straight lines which connect a center and outer peripheral portion of the diaphragm section to each other.

10. The pressure sensor according to claim 2, wherein the beam section and the thin film sections are formed in point-symmetry with respect to the center of the diaphragm section at every predetermined angle.

11. The pressure sensor according to claim 2, wherein the diaphragm section includes a thick film section on a center region thereof, the thick film section being thicker than the thin film sections.

12. The pressure sensor according to claim 10, wherein at least one of the thin film sections is provided on each of straight lines which connect the center and outer peripheral portion of the diaphragm section to each other.

13. The pressure sensor according to claim 10, wherein the second substrate includes an electrode or a piezoresistor at a position opposite to a thick film section of the first substrate which is located on an outer peripheral side of the thin film sections arranged in a substantially circular shape.

14. The pressure sensor according to claim 12, wherein the second substrate includes an electrode or a piezoresistor at a position opposite to a thick film section of the first substrate which is located on an outer peripheral side of the thin film sections arranged in a substantially circular shape.

15. The pressure sensor according to claim 3, wherein at least one of the thin film sections is provided on each of straight lines which connect a center and outer peripheral portion of the diaphragm section to each other.

16. The pressure sensor according to claim 3, wherein the beam section and the thin film sections are formed in point-symmetry with respect to the center of the diaphragm section at every predetermined angle.

17. The pressure sensor according to claim 3, wherein the diaphragm section includes a thick film section on a center region thereof, the thick film section being thicker than the thin film sections.

18. The pressure sensor according to claim 16, wherein at least one of the thin film sections is provided on each of straight lines which connect the center and outer peripheral portion of the diaphragm section to each other.

19. The pressure sensor according to claim 16, wherein the second substrate includes an electrode or a piezoresistor at a position opposite to a thick film section of the first substrate which is located on an outer peripheral side of the thin film sections arranged in a substantially circular shape.

20. The pressure sensor according to claim 18, wherein the second substrate includes an electrode or a piezoresistor at a position opposite to a thick film section of the first substrate which is located on an outer peripheral side of the thin film sections arranged in a substantially circular shape.

\* \* \* \* \*